United States Patent Office 3,136,171
Patented June 9, 1964

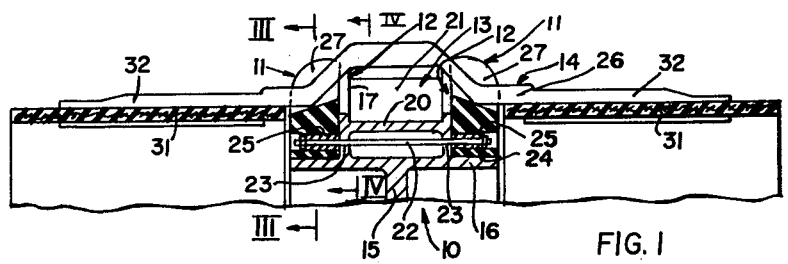
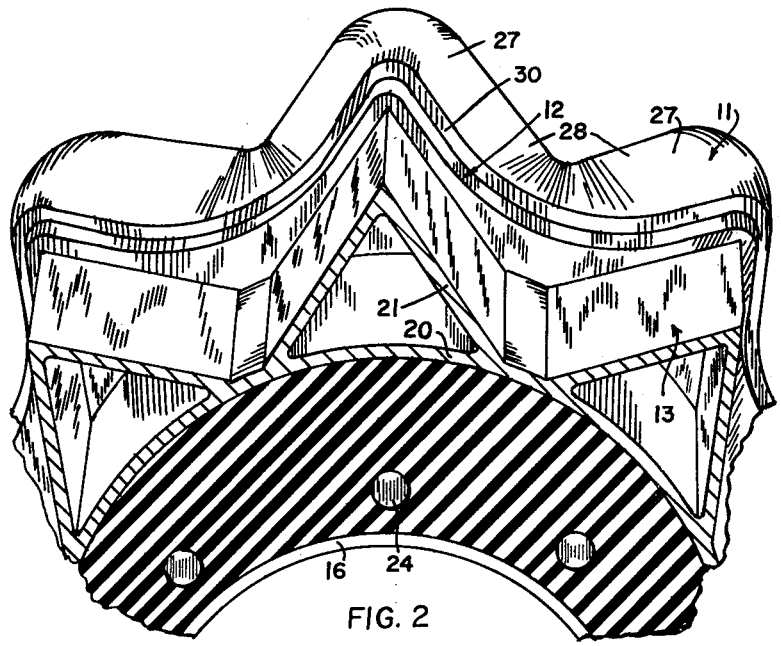
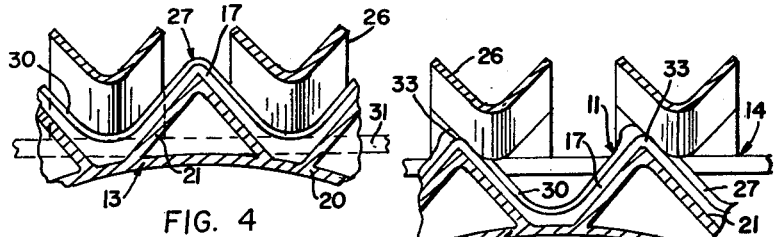
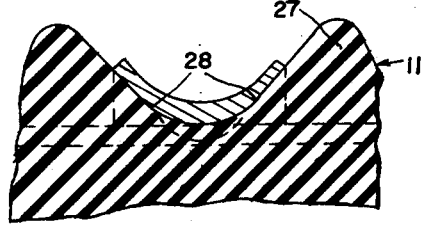
INVENTOR
WILLIAM B. NODWELL

3,136,171
OVERLOAD SPROCKET FOR TRACK
LAYING VEHICLES
William Bruce Nodwell, Calgary, Alberta, Canada,
assignor to Robin-Nodwell Mfg. Ltd., Calgary, Alberta,
Canada
Filed Oct. 26, 1961, Ser. No. 147,979
6 Claims. (Cl. 74—243)

This invention relates to a driving wheel for a vehicle of the track laying type, and more particularly, to a driving wheel which is provided with overload teeth for assuming the driving load in the case of overload conditions but not otherwise.

Tractors and other vehicles, which are propelled by the action of a drive wheel on an endless track, play important roles in construction and forest industries, in transporting goods and materials to remote areas, or wherever it is necessary to carry out operations on rough and unimproved surfaces. A common type of flexible track used on such vehicles is provided with a plurality of spaced transverse grouser bars which are engaged by sprocket teeth on a driving wheel of the vehicle. As described in my United States Patent No. 2,893,787, July 7, 1959, it has been found in practice that during sudden overloading of the track due to irregularities of the terrain or other causes, the stress on the track can become high enough to cause the track to be stretched longitudinally within its elastic limit. The stretching of the track causes an extension in the pitch of the grouser bars, and in accordance with this extended pitch, the grouser bars start climbing up the sprocket teeth of the drive wheel until, as is frequently the case, the full load is placed upon the top of the sprocket teeth.

It is desirable to form the sprocket teeth of rubber or like resilient material to permit wear resistant and relatively noiseless engagement between the teeth and grouser bars. However, when the full load moves up to the top of the teeth under overload conditions, the uppermost portion of the resilient teeth cannot sustain the force, and thus bend, allowing the track to slip. Such slip, of course, prevents the vehicle from utilizing its power for driving and may cause damage to the wheel and track.

As mentioned above, vehicles of the track laying type are used mainly on rough and unimproved surfaces, and although the drive wheel of U.S. Patent No. 2,893,787 has satisfactorily eliminated the slip between the track and the drive wheel, it has been found in practice that there is a tendency for stones, ice, chips of wood and other debris to jamb between the drive sprockets and overload sprocket. The collection hinders the successful operation of the drive wheel and may cause damage to it and to the track.

The present invention, which is an improvement over my drive wheel of U.S. Patent No. 2,893,787, provides a pair of axially spaced apart load sprockets having driving teeth thereon, the teeth having faces arranged to engage grouser bars on the track, a pair of axially spaced apart overload sprockets mounted between the load sprockets, the overload sprockets having overload teeth arranged to assume the load of the grouser bars only in the case of overload conditions under which the track stretches, and spacer means arranged between the overload teeth to impede the collection of debris between the overload sprockets.

Preferably, the driving teeth and overload teeth are axially aligned and the overload sprockets, the teeth of which are formed of material having a greater resistance to deformation by the grouser bars than said driving teeth, abut the load sprockets, the teeth of which are constructed of resilient, wear-resistant material.

In a preferred embodiment of the invention, the load teeth are of larger profile than the overload teeth so that the driving wheel must in operation be deformed by a grouser bar before that bar can engage the overload teeth.

Preferably, the spacer means comprises a plurality of elongated V-shaped members, one of which extends between each axially aligned pair of overload teeth, the V-shaped members being so shaped with respect to the overload teeth that the axial spaces between the overload teeth are substantially filled by the V-shaped members.

In the drawings, which show one embodiment of the invention,

FIG. 1 is a partial sectional view through the load and overload sprockets and spacer means, but showing the wheel in engagement with the track;

FIG. 2 is a perspective view of an arcuate portion of the sprockets and spacer means with the teeth of the nearest load and overload sprocket cut away to improve the view of the spacer means;

FIG. 3 is a partial sectional view taken along line III—III of FIG. 1 showing the position of the grouser bar during normal operation;

FIG. 4 is a partial sectional view taken along line IV—IV of FIG. 1 showing the position of the grouser bar during normal operation; and FIG. 4a is a view similar to FIGURE 4 but showing the position of the grouser bar under conditions of abnormally heavy load on the track.

Referring to FIG. 1, the driving wheel 10 of the present invention includes generally a pair of axially spaced apart load sprockets 11, 11, a pair of axially spaced apart overload sprockets 12, 12, and a spacing means 13 located between the overload sprocket 12, 12. Under normal operating conditions the vehicle (not shown) is propelled through the engagement of the load sprockets 11, 11 with a track 14.

The drive wheel 10 is secured to a power axle (not shown) of the vehicle by a hub member 15 and is rotated thereby. Fixed to the outer periphery of the hub member 15, or formed integrally therewith, is a rim member 16. The pair of axially spaced overload sprockets, 12, 12 are in turn fixed, as by welding, to the outer surface of the rim 16 and extend radially outwardly from it. The two overload sprockets, which are preferably made of steel, have axially aligned overload teeth 17 formed on their outer edge.

Welded or otherwise fixed between the overload sprockets is a cylindrical ring member 20 which is slightly less in diameter than the diameter of the dedendum circle of the overload sprockets 12. Around the outer periphery of the ring member 20 there is secured a plurality of V-shaped members 21, as shown in FIG. 2, one of which extends between each pair of axially aligned overload teeth 17. The V-shaped members 21 are generally similar in shape to the overload teeth 17 and may be welded to the teeth, so that the combination of the ring member 20 and V-shaped members 21 provide a spacer means which substantially fills the space between the overload sprockets 12, 12.

The inner diameter of the load sprockets 11, 11 (which are made of resilient, wear-resistant material, such as rubber) is the same as the outer diameter of the rim member 16 so that they fit over the rim to abut the overload sprockets 12, 12. The load sprockets are held against the overload sprockets and are prevented from rotating on the rim 16 by a plurality of bolts 22 which extend through aligned holes 23 in the overload sprockets. The load sprockets 11, 11 are provided with a plurality of holes 24 into which are vulcanized metal sleeves 25 (see FIG. 1) to permit the load sprockets to be pulled tightly against the overload sprockets 11 by the bolts 22. The load sprockets 11, 11 are provided with teeth 27 arranged to engage grouser bars 26 of the track 14. The teeth 27 are slightly larger in profile, i.e. slightly thicker, than the teeth 17 so that a margin 30 of the resilient teeth 27 extends outwardly beyond the profile of the overload teeth 17.

The track 14 includes two parallel, flexible, endless belts 31, 31 which are secured to outer ends 32, 32 of a plurality of spaced, transverse grouser bars 26. The belts 31, 31 are spaced apart, as shown in FIG. 1, a greater distance than the total thickness of the sprockets and spacer means so that the sprockets can extend between them and engage the grouser bars 26. The spacing of the grouser bars under normal load conditions is equal to the spacing of the teeth 27, or some multiple of such spacing, so that they normally engage the grouser bar engaging faces 28 of the teeth 27 as shown in FIG. 3, i.e. normally engage the valleys between teeth 27.

Therefore, under normal load conditions, the load will be applied to the resilient teeth as shown in FIGS. 1 and 3. However, if overload conditions are experienced by the track, causing it to stretch, the pitch of the grouser bars increases with the result that the grouser bars climb up the teeth 27 from the position shown in FIG. 4 to that shown in FIG. 4a. As the grouser bars approach the top of the teeth 27, the resilient teeth 27 yield, as shown at 33 in FIG. 4a, under the load until the grouser bars engage the overload teeth 17. Once this has happened, the metal teeth 17 assume the load and the drive of the vehicle is not interrupted by slipping of the track. Since the load teeth 27 have a greater profile than the overload teeth 17 the grouser bars cannot bear against the overload teeth under normal conditions but will only engage the wear-resistant resilient load teeth 27.

The spacer means formed by the ring member 20 and V-shaped members 21 is so situated that it at no time engages the track, yet it will prevent the collection of debris between the overload sprockets 12, 12 which debris, as previously pointed out, might cause damage or hinder the operation of the drive wheel and track. Furthermore, the spacing members 20 and 21 serve to reinforce the sprockets 17, thereby preventing the overload sprocket from becoming bent or twisted during operation of the vehicle in extremely rugged terrain.

What I claim as my invention is:

1. A driving wheel for a track of a tracked vehicle comprising a pair of axially spaced apart load sprockets having driving teeth thereon, said teeth having faces arranged to engage grouser bars on the track, a pair of axially spaced apart overload sprockets mounted between said load sprockets, said overload sprockets having overload teeth arranged to assume the load of the grouser bars only in the case of overload conditions under which the track stretches, and spacer means arranged between said overload teeth to impede the collection of debris between said overload sprockets.

2. A driving wheel as defined in claim 1, in which the driving teeth on one of said pair of load sprockets are aligned with the driving teeth on the other of said pair, and in which the overload teeth on one of said pair of overload sprockets are aligned with the teeth on the other of said last-mentioned pair.

3. A driving wheel as defined in claim 2, wherein said overload sprockets abut said load sprockets, and wherein the driving teeth of the load sprocket are constructed of resilient, wear-resistant material and the overload teeth are formed of material having a greater resistance to deformation by the grouser bars than said driving teeth.

4. A driving wheel as defined in claim 3, wherein the overload teeth are axially aligned with the driving teeth and the driving teeth are of greater thickness than the overload teeth so that the grouser bar engaging faces of said driving teeth extend outwardly beyond said overload teeth whereby said driving teeth must be deformed by a grouser bar before the grouser bar can engage said overload teeth.

5. A driving wheel as defined in claim 4, wherein the spacer means includes a plurality of elongated V-shaped members, one of which extends between each axially aligned pair of overload teeth, said V-shaped members being so shaped with respect to the overload teeth that the axial spaces between the overload teeth are substantially filled by said V-shaped members.

6. A driving wheel for a track of a tracked vehicle comprising a pair of axially spaced apart load sprockets having axially aligned driving teeth thereon of resilient wear-resistant material adapted to engage grouser bars on said track, a pair of axially spaced apart overload sprockets mounted between and abutting said load sprockets, said overload sprockets having axially aligned overload teeth formed of material having a greater resistance to deformation by the grouser bars than said driving teeth, the driving teeth being axially aligned with said overload teeth but having a larger profile than said overload teeth so that said driving teeth must in operation be deformed by a grouser bar before that bar can engage said overload teeth, a spacing ring member extending between and being in concentric relationship to the pair of overload sprockets, said ring member having an outer diameter which is slightly less than the diameter of the dedendum circle of the overload sprocket, a plurality of V-shaped spacer members secured to the outer periphery of said spacing ring member to form a plurality of spaced pointed teeth, said pointed teeth being axially aligned with said overload teeth and having sufficient depth and width to substantially fill the space between each pair of aligned overload teeth.

References Cited in the file of this patent

UNITED STATES PATENTS

| | | |
|---|---|---|
| 1,870,801 | Engsham | Aug. 9, 1932 |
| 2,199,331 | Carlsson | Apr. 30, 1940 |
| 2,389,624 | Knox et al. | Nov. 27, 1945 |
| 2,708,978 | Robitaille | May 24, 1955 |
| 2,893,787 | Nodwell | July 7, 1959 |
| 2,941,494 | McBride | June 21, 1960 |
| 3,057,219 | Montgomery | Oct. 9, 1962 |